United States Patent Office 3,187,880
Patented June 8, 1965

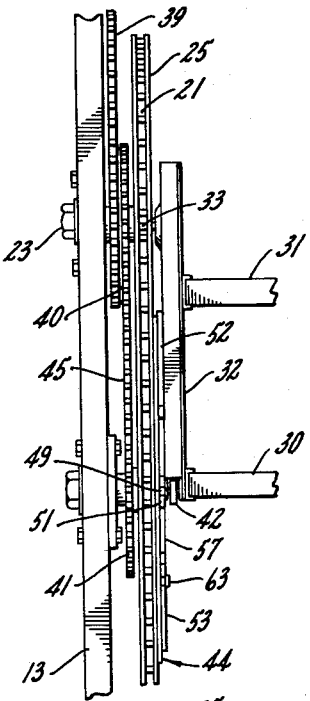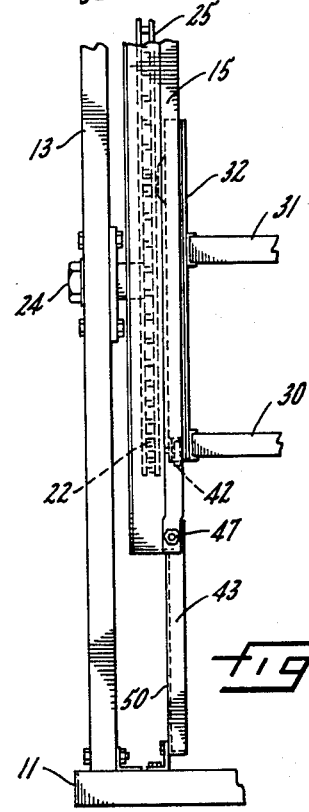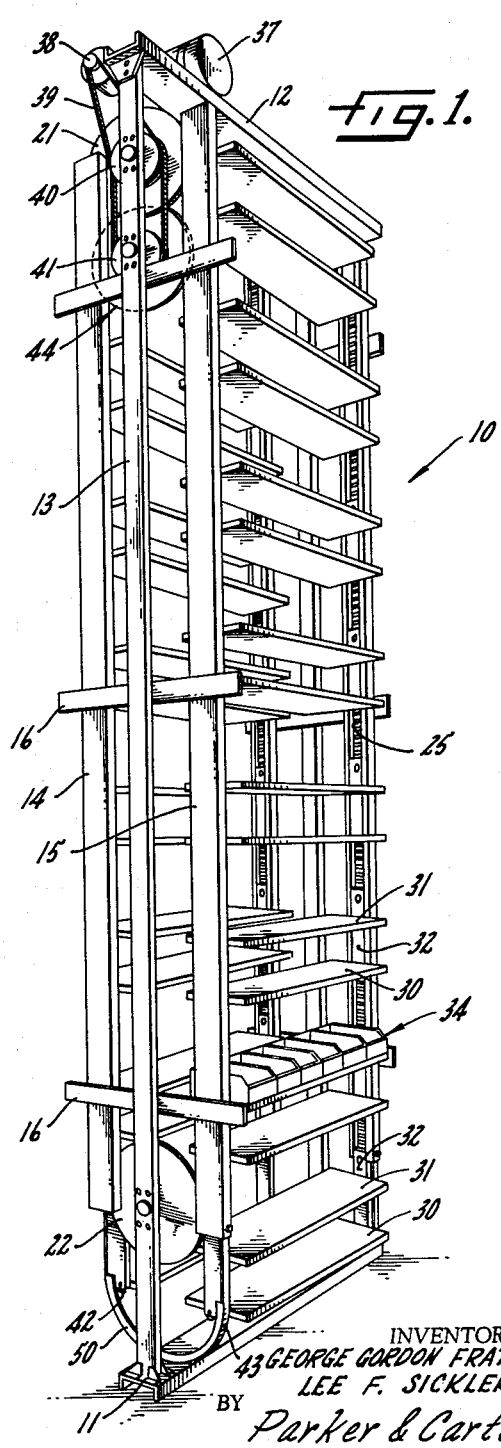

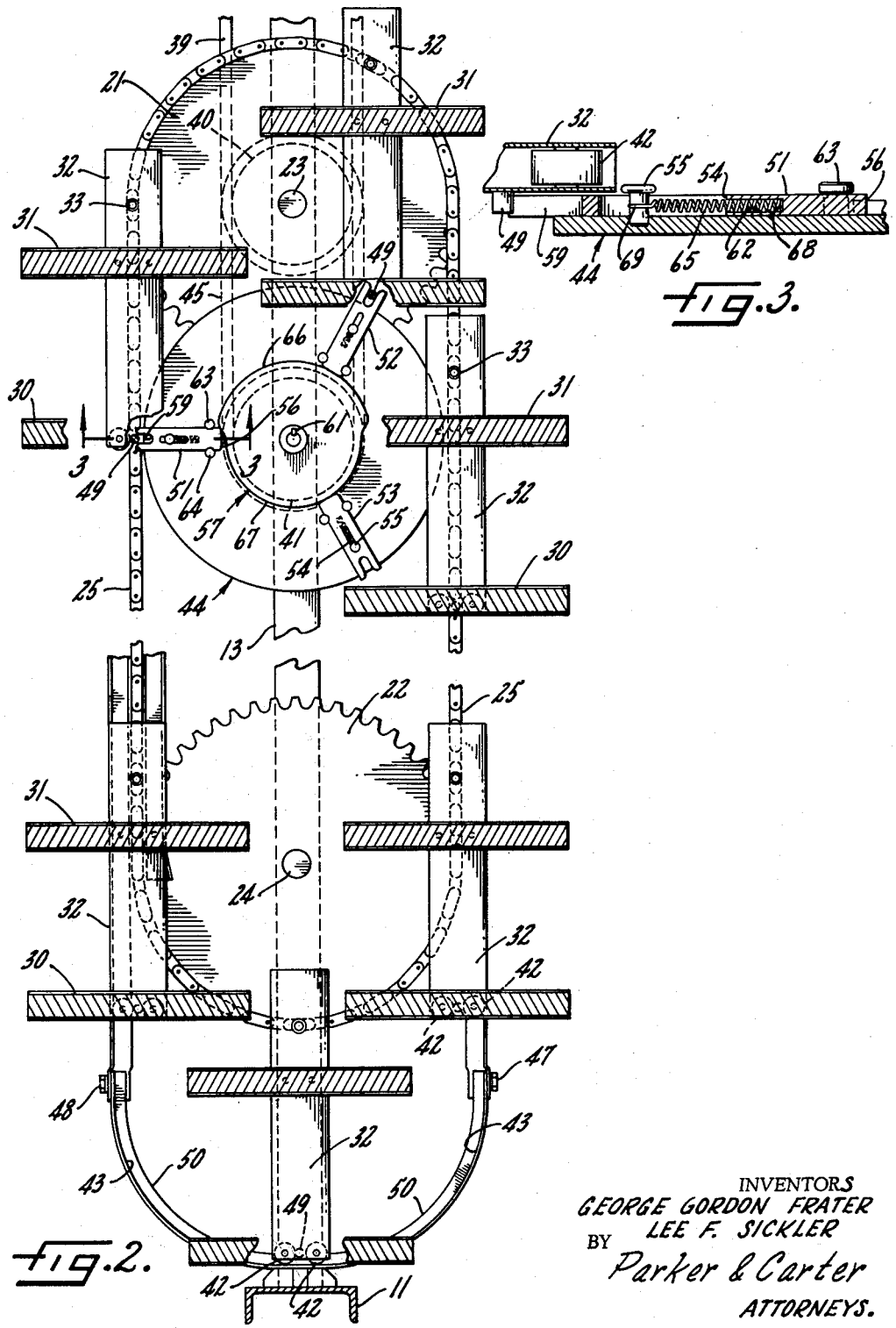

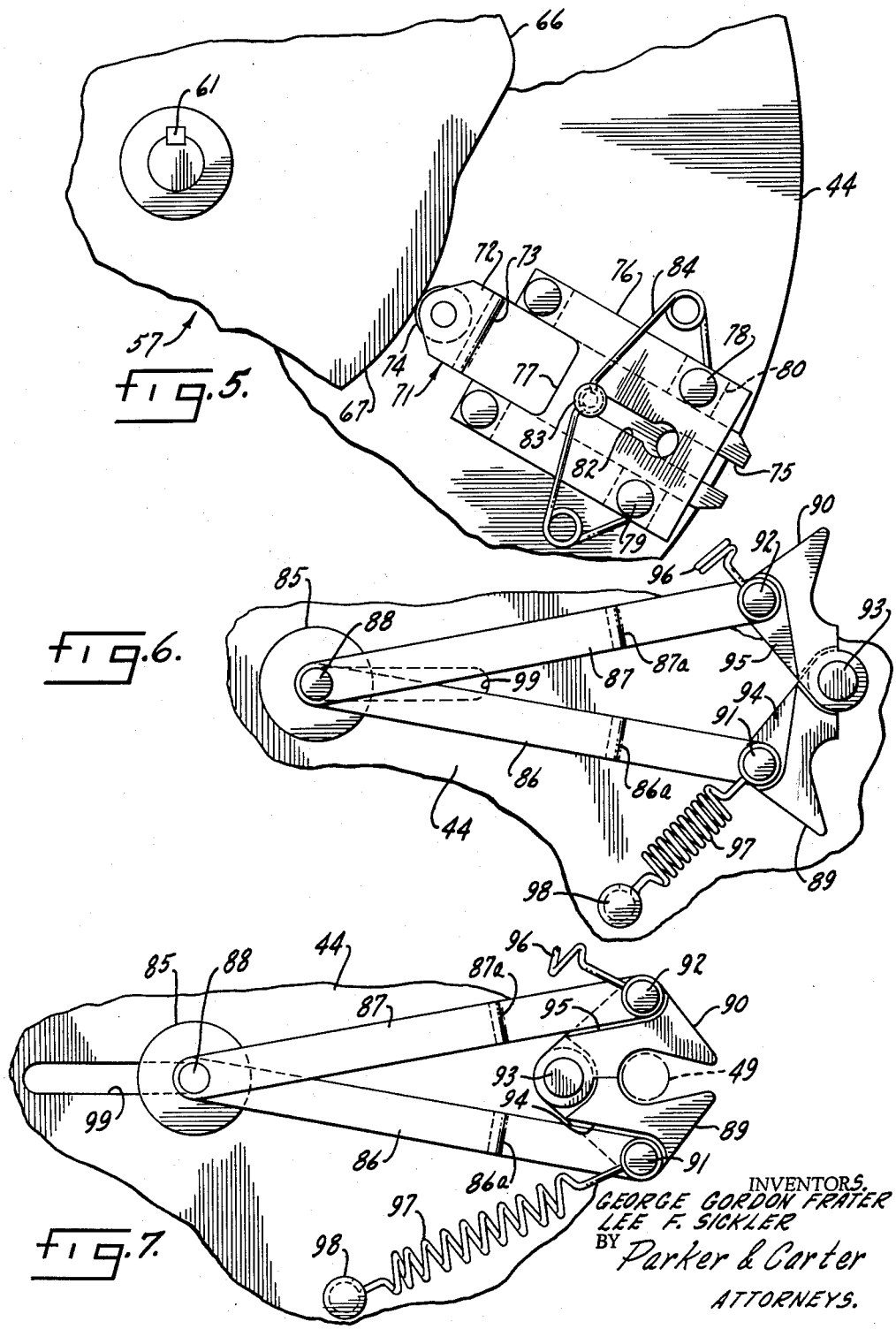

3,187,880
CONVEYOR WITH STABILIZING MEANS
George Gordon Frater and Lee F. Sickler, Watertown, Wis., assignors to G. B. Lewis Company, Watertown, Wis., a corporation of Wisconsin
Filed June 4, 1962, Ser. No. 199,736
8 Claims. (Cl. 198—158)

This invention relates to conveyors, in particular, a conveyor of endless shelves which move in a straight line and in an orbit around sprocket wheels.

A primary object of this invention is an endless conveyor in which shelves can move without rocking or swinging around opposite sprocket wheels.

Another object is an endless conveyor in which containers on a moving shelf are not upset by the shelves swinging or rocking as they move around rotating sprocket wheels.

Another object is a shelf conveyor in which shelves are pivotally connected between opposed sprocket chains and remain level and stable when they pass around rotating sprocket wheels.

Another object is a conveyor for shelves which has a stabilizing plate positioned near a rotating sprocket wheel to engage and hold shelves as they move around the sprocket wheel.

Another object is a conveyor having pivotal shelves and a stabilizing disc having radially movable arms to engage and disengage a shelf to maintain transitional stability about the sprocket wheel.

Another object is a conveyor having a stabilizing disc positioned near a sprocket wheel and having radially movable arms slidably fixed to the stabilizing disc at spaced positions synchronized to permit the arms to meet and engage a shelf as it moves around the sprocket wheel.

Another object is a conveyor having a stabilizing disc near a rotating sprocket wheel, movable arms slidably fixed to the disc, and a stationary cam adjacent the disc with cam surfaces to contact the arms to thereby move them in and out.

Another object is a conveyor having a stabilizing disc positioned near a rotatable sprocket wheel and responsively joined to the wheel to move therewith, said disc having radially movable arms slotted at one end to engage projecting pins on pivotal shelves as the shelves move around the sprocket wheel.

Another object is a conveyor in which moving shelves have a roller on one end adapted to ride an arcuate track around lower sprocket wheels to maintain level stability of the shelves as they move around the lower sprocket wheel.

Another object is a vertical conveyor in which pivotal shelves are restrained from rocking and swinging by a stabilizing disc as they move around the upper sprocket wheels and maintain their horizontal stability by riding a track around the lower sprocket wheels.

The foregoing objects are now attained by the invention which will be described in detail and which is illustrated in the accompanying drawings wherein:

FIGURE 1 is a perspective view of a conveyor unit,

FIGURE 2 is a side view with parts in section and with parts broken away,

FIGURE 3 is a view through line 4—4 of FIGURE 2,

FIGURE 4 is a front view with parts removed and with parts broken away,

FIGURE 5 is another embodiment of an engaging arm,

FIGURE 6 is still another embodiment of an engaging arm, and

FIGURE 7 is the arm of FIGURE 6 in locking engagement.

Like reference numerals in the various views of the drawings will refer to the same elements or structures.

A conveyor unit is generally shown as 10 in FIGURE 1, and such an illustrated unit may be joined to a like unit to extend a conveying shelf system laterally, vertically or in other ways. The conveyor unit has a frame which includes a base bar 11 at the bottom and a head bar 12 at the top. The bars are connected on one side by a side bar 13 and on the other side by a similar side bar. Channels such as 14, 15 flank the side bar on each side of the unit. The channels are connected to the side bar by a crossbrace such as 16 by means not shown. To the side bar 13 is rotatably fixed an upper sprocket wheel 21 and a lower sprocket wheel 22 about a fixed axis 23 and 24 respectively. An opposed upper sprocket wheel is on the other side of the unit and shares the same axis of rotation with sprocket wheel 21. Likewise, an opposed lower sprocket wheel is on the other side of the unit and shares a common axis of rotation with lower sprocket wheel 22. Channels 14 and 15 house an endless sprocket chain 25 which may be seen in the channels on the other side of the unit. Thus, the endless sprocket chain 25 on one side of the unit travels around the upper and lower sprocket wheels, and a like endless sprocket chain rides in channels 14 and 15 and around sprocket wheels 21 and 22 on the other side of the unit.

A plurality of shelves are fixed to the opposed sprockets and are adapted to move linearly in an up-and-down direction at the front and back of the unit, and in an orbit around the upper opposed sprockets and the lower opposed sprockets. The shelf units are shown here as shelves 30 and 31 fixed at one end to an upright end wall 32 and at the other end to a similar upright end wall. The upper portion of the end wall is pivotally connected to sprocket chain 25 by opposed trunnions, one of which is seen at 33. The trunnions may be immovably fixed to a link of the sprocket chain, and pivotally fixed to an upper portion of the end wall to thereby permit the shelf units to swing to and fro. The shelf unit shown herein is therefore seen to comprise a pair of spaced shelves pivoted to end walls and fixed to the moving sprocket chain. The shelves may be dimensioned to conveniently hold hopper containers such as at 34.

The endless sprocket chain 25 may be driven by any suitable motive force 37 wherein a rotating shaft 38 drives sprocket chain 39 which rotates grooved wheel 40 integrally joined with upper sprocket wheel 21. A particularly suitable motive means is one wherein a motor and fluid coupling are combined to provide a smooth and gradual acceleration to the moving shelves. Suitable brake means may also be included in such a motor to stop the moving shelves at a selected position convenient to the reach of a workman.

FIGURE 2 shows in detail the means to stabilize the shelves throughout their transit. The moving shelves are stabilized around the lower sprocket 22 by rollers 42 riding an arcuate track 43 and guided by an upright track rail 50. The arcuate track may be secured to the bottom of the frame by bolts or the like 47, 48.

The principal feature of the stabilization system keeps the shelves on an even level when they move around upper sprocket wheel 21. A stabilizing disc 44 is placed near the upper sprocket wheel 21. Disc 44 is responsively engaged to sprocket 21 by sprocket chain 45 which transmits motive power to grooved wheel 41 integrally joined with stabilizing disc 44. Stabilizing disc 44 is seen to have spaced and radially movable engaging arms 51, 52 and 53. The arms are similarly constructed and similarly mounted on the disc 44, therefore, a description of portions of one arm will likewise apply to another arm. The arm has an open jaw 59 to engage a pin 49 projecting from the end of the shelf between rollers 42, 42. The arm 51 is slotted as at 54 to ride on a pin 55 which is fixed to the disc 44. The pin and slot arrangement permits the arm 51 to move radially in and out to engage and disengage the pin 49 at different times when the shelf to which the pin is fixed is making its transit around upper sprocket wheel 21. The arm moves in and out by having end 56 follow the high and low surfaces of a stationary cam disc 57 which is fixed to a dead shaft by a key 61. The radial movement of arm 51 is linear because raised guide pins 63, 64 keep the arm in a straight track. It is seen that as the disc 44 rotates, arm 51 moves radially outward as end 56 contacts the higher surface 66 of cam 57, and jaw 59 engages and maintains engagement with pin 49 on the shelf. The disc arm disengage from the pin when the arm moves radially inwards towards the center of the disc as end 56 follows the lower surface 67 of the cam 57.

The arm is urged towards the center of the disc by a compression spring 65 which is disposed in the slot 54 and pocket 62 in the arm 51. The spring may be joined at one end as at 69 to pin 55 which is fixed to the disc 44, and the other end may be compressibly urged against end wall 68 of pocket 62.

The arms 51, 52 and 53 are positioned on the disc 44 so that the rate of rotation of the disc is synchronized to enable a radial arm to meet and engage the pin 49 as the shelf begins its transit around the orbit of the upper sprocket 21.

The relationship of the various parts may be seen in the view of FIGURE 4. The sprocket chain 39 drives grooved wheel 40 which, in turn, drives upper sprocket wheel 21 about the axis of rotation 23. Sprocket chain 45 transmits power to grooved wheel 41 which drives disc 44 shown just laterally extending beyond sprocket chain 25. Arms 51, 52 and 53 are shown in their various positions on the stabilizing disc 44 next to stationary cam 57. Pin 49 is shown fixed and engaged to the open jaw 59 of radial arm 51. The lower portion of FIGURE 2 shows the roller 42 in phantom outline riding track 43 and positioned by guide rail 50.

A modified form of a movable arm is shown in FIGURE 5 and includes an arm 71 having an offset raised portion 72 with shoulder 73 and attached roller 74 at one end, and an open jaw 75 at the other end. The arm coacts with a bracket plate 76 which is fixed in a raised position to disc 44 by rivets, bolts or the like such as 78 and 79. A passageway partly defined by end edge 77 is formed in the bracket plate and is dimensioned so that raised offset 72 can pass through until shoulder 73 abuts edge 77.

Spacers such as 80 indicated by the phantom outline at the corners of the plate 76 may be used to fix the raised position. The plate has a slot 82 and the arm 71 has a raised pin 83 which extends through and overlaps slot 82. A compression spring 84 has free ends fixed to the screws 78, 79 and has a loop portion fixed to pin 83. When roller 74 contacts high surface 66 of the cam disc 57, arm 71 will move radially outward until shoulder 73 abuts the end edge 77 of the passageway. Spring 84 will correspondingly flex as pin 83 moves with arm 71 outwards. When the roller 73 again contacts low cam surface 67, the resiliency of flexed spring 84 will urge arm 71 to move inward and shoulder 73 will move away from edge 77 of the passageway.

An advantageous engaging arm is shown in FIGURES 6 and 7, and includes a toggle locking action which not only holds the pin from the end wall of the shelf, but confines the pin with the locked jaw to prevent outward swinging of the shelf as it moves around the top sprocket. FIGURE 5 shows the position of the arm when roller 85 is riding low cam surface 67. Links 86, 87 which are offset downwardly as at 86a and 87a are joined to roller 83 about a pivot 88 and each link is joined to jaws such as 89 and 90 about pivots 91 and 92 respectively. The jaws move about a fixed pivot 93.

The jaws 89, 90 have depressions 94, 95 dimensioned to seat the ends of links 86 and 87 when the jaws lock, as shown in FIGURE 7. Springs 96, 97 connect the links and are anchored as at 98 to the disc 44. As the roller contacts the high cam surface 66, jaws 89, 90 will be moved to a closed position against the urging of springs 96, 97. The jaws are closed by links 86, 87 moving outward as pin 88 rides slot 98 in the disc. The fully closed position of the jaws, as shown in FIGURE 7, will lock the shelf pin 49, as shown by dotted outline, within the confines of the jaws. It is seen that the opening of the closed jaws is too small to permit the pin 44 from moving out of the jaw. When the roller again rides the low cam surface 67, the extended springs 96 and 97 will pull the links 86, 87 back towards the center of the disc until pin 88 sits at the other end of slot 99, as shown in FIGURE 6.

The use and operation of our invention are as follows:

The conveyor shelf unit 10 has been illustrated and described as being preferably in an upright or vertical position, but the stabilizing means for maintaining the shelves on a straight level in their transit around the sprocket wheels may be used in conveyor shelf units which are otherwise arranged. Such conveyor shelves may be used in stockrooms and the like and may have a number of containers such as 34 arranged on a shelf. Various components may be assigned to given hopper boxes in accordance with a particular catalog procedure. The operator may obtain a given component by starting the motive force 37 to move the shelves at first linearly at the front of the container, then in an orbit around the lower sprocket 22, again, linearly at the back of the unit, and again in an orbit around the upper sprocket 21. If no means are provided for keeping the shelves on a straight level, a problem could be encountered from rocking or swinging when the shelves make their transit around the upper sprocket wheel 21. This is aggravated when multiple containers such as 34 are seated on the shelves because such containers and their contents may be easily upset and spilled on the ground.

A stabilizing plate is positioned proximate to the upper sprocket wheel 21 and said plate is responsively rotated with the upper sprocket wheel 21 by a motive force 37. One side of the stabilizing plate has a plurality of spaced arms adapted to be actuated for engaging and stabilizing the shelves. Adjacent the central portion of the stabilizing disc, on the same side as the arms, is a stationary cam 57. The arms rotate with the plate and contact the cam surfaces at one of their ends. The ends follow the high and low cam surfaces 66, 67 and, accordingly, may move in towards the center of the plate, out towards the edge of the plate; may actuate links or the like to close a jaw; or actuate the arm in other equivalent ways. The stabilizing plate may be in the form of a disc 44, as shown.

The arms may have an open jaw such as 59 to engage the pin, and a longitudinal slot 54, as shown, to ride a pin 55 fixed to the disc. A slot 62 may be present in the arm 51 to hold a spring 65 which urges the arms towards the center of the stabilizing disc. The arms are so spaced about the stabilizing disc that they are synchronized to meet and engage means such as a pin 49 near the bottom portion of the end wall as the shelf approaches upper sprocket wheel 21. Other types of movable arms with different actuating means to engage the pin are intended, as well as various means, including resilient, for urging the arms back to the low cam surface. Toggle action arms which are actuated to close jaws about a fixed point, for example, have been shown as an alternative embodiment. It is generally provided that positioning means, such as a slot and pin assembly, guide the arm in linear travel to and from the cam surfaces.

The stabilizing disc is positioned proximate to the upper sprocket wheel at such a selected distance that an end wall 32 of given length has its bottom portion riding closely to the circumference of the stabilizing disc 44 as the shelf moves around the upper sprocket wheel 21. In this way, arm 51, for example, meets and engages the pin 49 while the shelf is still generally aligned with a linear portion of the sprocket chain. Up to this point, end 56 of the arm follows the low cam surface 67 of the stationary cam 57. As the shelf begins its transit around the upper sprocket wheel, the end 56 of the radially movable arm begins to ride the high surface 66 of the cam and maintains its engagement with the projecting pin 49. This engagement is continued as the shelf moves around the top sprocket wheel, and the level stability of the shelf is thereby maintained. When the shelf again aligns itself with the linear portion of the sprocket chain behind the conveyor unit, the radially movable arm becomes disengaged. The spring 65 urges the arm towards the center of the disc as the arm leaves the high surface 66 of the cam onto the low surface 67 of the cam. The radial movement of such particular arms are directed by guide pins such as 63 and 64 which slidably position the arm as it linearly travels in the pin and slot assembly.

It is also contemplated by the teaching of this invention that the level stability of the shelves may be provided by an arcuate track at the bottom of the unit, although shelf stability around the bottom sprocket is not as serious a problem as around the top sprocket. Rollers 42, 42 which may flank the projecting pin 49 at the bottom portion of the end wall of the shelf unit are adapted to ride on the arcuate track 43 and to be guided by an upright track rail 50.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:

1. A shelf conveyor which includes, in combination, a pair of upper sprocket wheels, a pair of lower sprockets, a motive force to rotatably drive a sprocket wheel, endless sprocket chains connecting the sprockets, a plurality of shelves between the chains, pivotal means connecting the shelves to the opposed sprocket chains, a roller extending below the shelf, a rotatable stabilizing disc positioned below an upper sprocket wheel, means between the disc and wheel to transmit a rotational force, a stationary cam adjacent the central portion of the stabilizing disc, said cam having a low surface and a gradually increasing high surface, a plurality of radially movable arms on the disc synchronized to engage the shelf, said arms riding the surfaces of the stationary cam to move in and out as the disc rotates to gradually engage and disengage the shelf, a spring urging said arms towards the low surface of the cam, and an arcuate track adjacent the lower sprockets to engage the roller on the shelf so that the movement of a shelf on the lower sprocket is stabilized.

2. A shelf conveyor, which includes, in combination, a pair of upper sprocket wheels, a pair of lower sprocket wheels, endless sprocket chains connecting the sprockets, a motive force to rotatably drive a sprocket wheel, a plurality of shafts having opposed ends, pivotal means connecting the end walls to the opposed sprocket chains, a rotatable stabilized disc positioned below an upper sprocket wheel, means between the disc and wheel to transmit a rotational force, a stationary cam adjacent to the central portion of the stabilizing disc, said cam having a low surface, a gradually increasing high surface, a plurality of radially actuated arms on the discs synchronized to engage the shelf, said arms having closeable jaws at one of their ends, means to gradually move the jaws into engagement with the shelf as the arms gradually ride to the increasing high cam surface, and springs gradually urging the jaws out of engagement with the jaws as the arms gradually ride to the low cam surface.

3. A stabilizing assembly in a shelf conveyor which includes, in combination, a frame, a pair of spaced upper sprockets, a pair of spaced lower sprockets, endless sprocket chains connecting the upper and lower spaced sprockets, means to rotate a sprocket, a plurality of shelves carried at opposite ends by the spaced sprocket chains, a stabilizing plate spaced from a top sprocket, means to rotate said plate with the sprocket, a stationary cam, said cam adjoining the stabilizing plate, a movable arm joined to the plate, means on said arm to movably contact the cam surface so that the arm is actuated towards shelf engaging position, means on the end of the arm to engage and stabilize a shelf as the actuated arm moves toward the shelf when the shelf begins its passage around the top sprocket, and means to urge the arm away from the shelf engaging position as the shelf completes its passage around the top sprocket.

4. The stabilizing assembly of claim 3 further characterized in that the engageable means on the arm is an open jaw adapted to engage a pin on the movable shelf.

5. The stabilizing assembly of claim 3 further characterized in that the arm is urged by a spring to move towards the cam after the shelf has moved around the top sprocket.

6. A shelf conveyor which includes, in combination, a first pair of separated sprocket wheels, a second pair of separated sprocket wheels spaced from the first pair in general alignment, endless sprocket chains connecting the aligned sprocket wheels, motor means to rotatably drive at least one of the sprocket wheels, a plurality of shelves carried between the spaced sprocket chains, the opposite ends of said shelves pivotally connected to their adjoining sprocket chain, a stabilizing plate spaced from a sprocket wheel in the first pair, means between the plate and said sprocket wheel to rotate the plate with the wheel, a stationary cam next to the stabilizing plate, said cam having a low surface and a gradually increasing high surface, a plurality of arms slidably fixed to the stabilizing plate, the inner end of an arm adapted to ride the cam surfaces so that the arm is actuated into shelf engaging position, means on the outer end of an actuated arm to engage the stabilizer shelf as it begins its passage around the first pair of sprockets, and means to urge the arm away from shelf engaging position as the shelf completes its passage around the top sprocket and the inner end of the arm engages the low surface of the cam.

7. A shelf conveyor as in claim 6 further characterized in that the arm gradually moves out to the edge of the plate to engage and stabilize the shelf as one end contacts the increasing high cam surface.

8. A shelf conveyor as in claim 6 further characterized in that means gradually urge the arm to the low cam surface after disengaging the shelf.

References Cited by the Examiner

UNITED STATES PATENTS

| | | | |
|---|---|---|---|
| 832,986 | 10/06 | Levalley | 198—218 |
| 1,164,272 | 12/15 | Farnum | 198—210 X |
| 1,348,490 | 8/20 | Gill | 198—150 |
| 1,681,445 | 8/28 | Taliaferro | 198—209 |
| 1,859,874 | 5/32 | James | 198—158 |
| 2,775,335 | 12/56 | Simpson | 198—211 |

FOREIGN PATENTS 128,425  7/48  Australia.

SAMUEL F. COLEMAN, *Primary Examiner.*

WILLIAM B. LA BORDE, *Examiner.*